United States Patent
Kobaysahi et al.

3,691,199
Sept. 12, 1972

[54] 2-HYDROXY-INDOLE-3-DITHIOCARBOXYLATES

[72] Inventors: Goro Kobaysahi; Shinichi Sugawara, both of Nagasaki; Masatoshi Nagawa, Tokyo, all of Japan

[73] Assignee: Sankyo Company Limited

[22] Filed: April 15, 1970

[21] Appl. No.: 28,976

[30] Foreign Application Priority Data

April 19, 1969 Japan .....................44/30478
Nov. 27, 1969 Japan .....................44/95242

[52] U.S. Cl............260/326.12 R, 260/325, 424/274
[51] Int. Cl. ..............................................C07d 27/56
[58] Field of Search............................260/326.12 R

[56] References Cited

OTHER PUBLICATIONS

Noller, Chemistry of Organic Compounds (1965) p. 308.

Primary Examiner—Alex Mazel
Assistant Examiner—Joseph A. Narcavage
Attorney—Flynn & Frishauf

[57] ABSTRACT

Novel 2-hydroxyindole-3-dithiocarboxylic acid ester derivatives having the formula

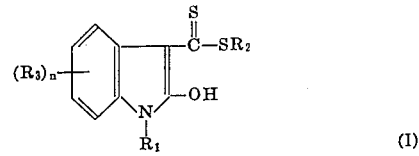

(I)

wherein $R_1$ is hydrogen atom, a lower alkyl group, an aryl group or an aralkyl group; $R_2$ is a lower alkyl group or an aralkyl group; $R_3$ is hydrogen atom, a lower alkyl group, a halogen atom, nitro group or a lower alkoxy group; and $n$ is an integer of 1 – 4 inclusive provided that where $n$ is 2 or more $R_3$ may be the same or different.

These indole derivatives (I) possess potent antibacterial activity against bacteria, particularly those causing bacillary dysentery, especially those resistant to prior art antibacterial agents, favorably via oral route and, thus, they are useful as a medicine for chemotherapeutic purpose.

These indole derivatives (I) can be prepared by reacting the oxyindole derivative having the formula

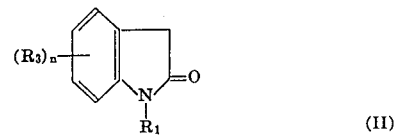

(II)

wherein $R_1$, $R_3$ and $n$ are as defined above with carbon disulfide in the presence of a basic condensation catalyst followed by subjecting the resulting product to the reaction with a sufficient amount of an alkylating agent to introduce one alkyl group into said product.

18 Claims, No Drawings

2-HYDROXY-INDOLE-3-DITHIOCARBOXYLATES

This invention relates to a new class of indole derivatives and a process for preparing the same.

More particularly, it relates to a novel 2-hydroxyindole-3-dithiocarboxylic acid ester derivative having the formula

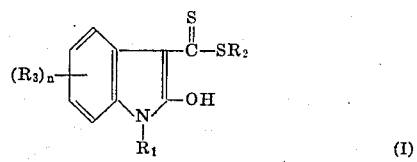

wherein $R_1$ is hydrogen atom, a lower alkyl group, an aryl group or an aralkyl group; $R_2$ is a lower alkyl group or an aralkyl group; $R_3$ is hydrogen atom, a lower alkyl group, a halogen atom, nitro group or a lower alkoxy group; and $n$ is an integer of 1 to 4 inclusive provided that where $n$ is 2 or more $R_3$ may be the same or different and a process for the preparation of the indole derivative (I).

In the above-mentioned formula (I), the aryl group may be illustratively exemplified by those groups of six to 10 carbon atoms, e.g. phenyl or naphthyl, the aralkyl group by those phenylalkyl groups, e.g. benzyl or phenethyl, the lower alkyl group by those groups of one to four carbon atoms, e.g. methyl, ethyl, n-propyl, n-butyl or tert-butyl, the halogen atom by chlorine, bromine or fluorine, and the lower alkoxy group by those groups of one to four carbon atoms, e.g. methoxy, ethoxy, propoxy or butoxy.

We have unexpectedly found that the above-specified new indole derivatives (I) of this invention exert potent antibacterial activity against human pathogenic bacteria, particularly dysentery bacilli and staphylococci, especially those bacteria developing resistance to various known antibacterial agents and thus they are very useful as a chemotherapeutic agent for the treatment of such bacterial diseases.

It is, accordingly, an object of this invention to provide a new group of the indole derivatives (I) which are valuable antibacterial agents.

It is another object of this invention to provide a new and advantageous process for the preparation of the indole derivatives (I) having such a beneficial property.

These and other objects of this invention will be apparent to those skilled in the art from the following detailed description.

In one aspect of this invention, there is provided the indole derivative (I), all of which are novel compounds unknown in the prior art. They may be satisfactorily employed for the treatment of various bacterial infections, especially those caused by dysentery bacilli and staphylococci, in the form of a pharmaceutical preparation which comprises the indole derivative (I) and a pharmaceutically acceptable carrier. The pharmaceutical preparation may be in any of the form of oral or parenteral, preferably oral, preparations. Such preferable preparations may include, for example, tablets, pills, granules, powders, more preferably enteric-coated, capsules and the like. In making these pharmaceutical preparations, there may conveniently employed any of pharmaceutical procedures and pharmaceutically acceptable carriers commonly utilized in the art. These pharmaceutical preparations may, if desired, contain various kinds and types of conventional auxiliary agents, e.g. preserving agents, stabilizing agents and the like.

The amount of the active indole derivative (I) to be administered for human beings, that is, the dosage of the present indole derivative (I) is usually in the order of about 10 mg. to about 200 mg. per kg. of body weight daily for adults, favorably in divided doses such as three or more times at intervals of about 6 to 8 hours a day, while large total daily dosages may be effectively employed in some cases. Of course, skilled physicians could be determined a suitable dosage, taking consideration of the ages and weight of patients, kinds and severities of diseases and other factors.

In another aspect of this invention, there is provided a process for the preparation of the indole derivative (I) which comprises reacting an oxyindole derivative having the formula

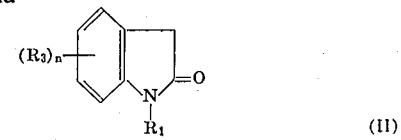

wherein $R_1$, $R_3$ and n are as defined above with carbon disulfide in the presence of a basic condensation catalyst followed by subjecting the resulting product to the reaction with a sufficient amount of an alkylating agent to introduce one alkyl group into said product.

In carrying out the process of this invention, suitable embodiment of the reaction may be conducted by adding the starting oxyindole derivative (II) and a basic condensation catalyst to an inert solvent, adding dropwise carbon disulfide to the resulting suspension, stirring the resulting mixture for an appropriate period, adding dropwise a calculated amount of an alkylating agent to the mixture and then again stirring the resulting mixture. As the solvent there may be satisfactorily employed any of those solvents that would not participate in the present reaction. Examples of such a solvent may include ethers, e.g. diethyl ether, 1,2-dimethoxyethane, tetrahydrofuran; aromatic hydrocarbons e.g. benzene, toluene, xylene; aliphatic carboxylic acid amides, e.g. dimethylformamide. Suitable examples of the basic condensation catalyst which may be employed in this invention include alkali metals, e.g. sodium; alkali metal hydrides, e.g. sodium hydride; alkali metal amides, e.g. sodium amide; and the like. Suitable examples of the alkylating agent which may be employed in this invention include alkyl halides, e.g. methyl iodide, methyl bromide, methyl chloride; dialkyl sulfates, e.g. dimethyl sulfate, diethyl sulfate; aromatic sulfonic acid alkyl esters, e.g. methyl p-toluenesulfonate; and the like. The calculated amount of the alkylating agent to be employed in this invention should be sufficient to introduce one alkyl group into one molecule of the condensation product. In other words, one can preferably use 1 mole of the alkyl halide or aromatic sulfonic acid alkyl ester or one half mole of the dialkyl sulfate, per mole of the starting indole derivative (II).

After completion of the reaction, the reaction product may be easily recovered from the reaction mixture by a conventional method, for example, by pouring the reaction mixture onto ice-water, making the mixture acidic, extracting the precipitate with a suitable solvent and then distilling off the extraction solvent. The resulting product may be further purified by a conventional method, for example, by recrystallization or chromatography, if desired.

It is to be understood that the indole derivative (I) of this invention is contemplated to include its tautomer which is illustratively shown hereinbelow:

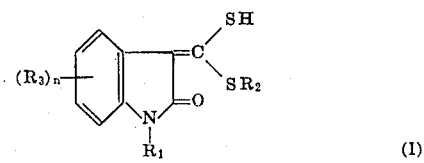

(I)'

The following examples are given for the purpose of illustrating this invention, but they should not be construed to be limiting the scope thereof.

EXAMPLE 1.

Methyl 1-methyl-2-hydroxyindole-3-dithiocarboxylate

In 20 ml. of anhydrous tetrahydrofuran were suspended 1.47 g. of 1-methyl-2-oxyindole and 0.96 g. of sodium hydride (containing 50 percent mineral oil). The resulting suspension was cooled to 0°C and an anhydrous tetrahydrofuran solution containing 0.76 g. of carbon disulfide was gradually added dropwise thereto. After completion of the dropwise addition, the resulting mixture was stirred for additional 30 minutes. Then, 0.63 g. of dimethyl sulfate was added dropwise at a temperature below 20°C. After completion of the dropwise addition, the resulting mixture was stirred for additional 30 minutes.

After completion of the reaction, the reaction mixture was poured onto a large amount of ice-water, the resulting mixture was made acidic by addition of hydrochloric acid and the precipitate thus formed was extracted with ether. The ether extract was dried over anhydrous sodium sulfate, the ether was distilled off and the residue was recrystallized from ether to give the desired product melting at 116° – 118°C.
Yield 65%.

Analysis for $C_{11}H_{11}NOS_2$
Calculated: C,55.69%; H,4.67%; N,5.91%
Found: C,55.54%; H,4.75%; N,6.02%

Following the same procedure as described above except that 1-ethyl-2-oxyindole was employed instead of the 1-methyl-2-oxyindole, there was obtained methyl 1-ethyl-2-hydroxyindole-3-dithiocarboxylate melting at 81° – 84°C.

EXAMPLE 2.

Ethyl 1-methyl-2-hydroxyindole-3-dithiocarboxylate

In 60 ml. of anhydrous tetrahydrofuran were suspended 4.41 g. of 1-methyl-2-oxyindole and 2.88 g. of sodium hydride (containing 50 percent mineral oil) to give a dark-colored suspension with evolution of hydrogen. This suspension was cooled to 0°C and an anhydrous tetrahydrofuran solution containing 2.28 g. of carbon disulfide was gradually added dropwise thereto with stirring. After completion of the dropwise addition, to the resulting mixture was added 2.31 g. of diethyl sulfate under cooling. Then, the resulting mixture was stirred for additional 30 minutes.

After completion of the reaction, the reaction mixture was treated in the same manner as in the above Example 1 to give 2.7 g. of the desired product melting at 95° – 98°C.

Analysis for $C_{12}H_{13}NOS_2$
Calculated: C,57.34%; H,5.21%; N,5.57%
Found: C,57.25%; H,5.23%; N,5.61%

EXAMPLE 3.

Methyl 2-hydroxyindole-3-dithiocarboxylate

In 60 ml. of anhydrous tetrahydrofuran were suspended 2.66 g. of 2-oxyindole and 1.92 g. of sodium hydride (containing 50 percent of mineral oil) to give a brown suspension with evolution of hydrogen. The resulting suspension was cooled to 0°C and an anhydrous tetrahydrofuran solution containing 1.52 g. of carbon disulfide was gradually added dropwise thereto with stirring. After completion of the dropwise addition, the resulting mixture was stirred for additional 1 hour. Then, to the resulting mixture was added dropwise 1.26 g. of dimethyl sulfate under cooling. After completion of the dropwise addition, the mixture was stirred for additional 1 hour.

After completion of the reaction, the reaction mixture was poured onto a large amount of ice-water, the resulting mixture was made acidic by addition of hydrochloric acid and the precipitate thus formed was extracted with ether. The ether extract was dried over anhydrous sodium sulfate and the ether was distilled off. The residual yellow crystalline substance was chromatographed through a silica gel column using chloroform as a solvent. The chloroform fractions were collected and the chloroform was distilled off to give 1.5 g. of the desired product melting at 160°C.

Analysis for $C_{10}H_9NOS_2$
Calculated: C,53.78%; H,4.06%; N,6.27%
Found: C,53.59%; H,4.16%; N,6.35%

EXAMPLE 4.

Ethyl 2-hydroxyindole-3-dithiocarboxylate

The same procedure as in the above Example 3 was repeated except that 1.54 g. of diethyl sulfate was employed instead of 1.26 g. of dimethyl sulfate to give 1.1 g. of the desired product melting at 155°C.

Analysis for $C_{11}H_{11}NOS_2$
Calculated: C,55.67%; H,4.67%; N,5.90%
Found: C,55.90%; H,4.60%; N,5.89%

EXAMPLE 5.

n-Propyl 2-hydroxyindole-3-dithiocarboxylate

The same procedure as in the above Example 3 was repeated except that 1.82 g. of di-n-propyl sulfate was employed instead of 1.26 g. of dimethyl sulfate to give 1.5 g. of the desired product melting at 145°C.

Analysis for $C_{12}H_{13}NOS_2$
Calculated: C,57.32%; H,5.12%; N,5.57%
Found: C,57.76%; H,5.42%; N,5.51%

EXAMPLE 6.

n-Butyl 2-hydroxyindole-3-dithiocarboxylate

The same procedure as in the above Example 3 was repeated except that 2.1 g. of di-n-butyl sulfate was employed instead of 1.26 g. of dimethyl sulfate to give 1.4 g. of the desired product melting at 137°C.
Analysis for $C_{13}H_{15}NOS_2$ Calculated: C58.82%; H,5.69%; N,5.27%
Found: C,59.15%; H,5.97%; N,5.24%

EXAMPLE 7.

Methyl 1-phenyl-2-hydroxyindole-3-dithiocarboxylate

In 60 ml. of anhydrous tetrahydrofuran were suspended 6.27 g. of 1-oxyindole and 2.88 g. of sodium hydride (containing 50 percent mineral oil) to give a brown suspension with evolution of hydrogen. This suspension was cooled to 0°C and an anhydrous tetrahydrofuran solution containing 2.28 g. of carbon disulfide was gradually added dropwise thereto. After completion of the dropwise addition, the resulting mixture was stirred for additional 1 hour and then 1.89 g. of dimethyl sulfate was added dropwise thereto under cooling.

Then, the reaction mixture was poured onto a large amount of ice-water, the resulting mixture was made acidic by addition of hydrochloric acid and the precipitate thus formed was extracted with ether. The ether extract was distilled off and then the residue was recrystallized from ether to give 1.7 g. of the desired product melting at 80°C.

Analysis for $C_{16}H_{13}NOS_2$
Calculated: C,64.18%; H,4.37%; N,4.82%
Found: C,63.92%; H,4.42%; N,4.82%

EXAMPLE 8.

Methyl 2-hydroxy-5-methylindole-3-dithiocarboxylate

The same procedure as in the above Example 3 was repeated except that 2.94 g. of 5-methyl-2-oxyindole was employed instead of 2.66 g. of 2-oxyindole to give 1.0 g. of the desired product melting at 145°C.

Analysis for $C_{11}H_{11}NOS_2$
Calculated: C,55.69%; H,4.67%; N,5.90%
Found: C,55.34%; H,4.65%; N,6.23%

EXAMPLE 9.

Methyl 2-hydroxy-7-methylindole-3-dithiocarboxylate

The same procedure as in the above Example 3 was repeated except that 2.94 g. of 7-methyl-2-oxyindole was employed instead of 2.66 g. of 2-oxyindole to give 1.4 g. of the desired product melting at 130°C.

Analysis for $C_{11}H_{11}NOS_2$
Calculated: C,55.69%; H,4.67%; N,5.91%
Found: C,55.72%; H,4.82%; N,6.21%

EXAMPLE 10.

Methyl 2-hydroxy-5-methoxyindole-3-dithiocarboxylate

The same procedure as in the above Example 3 was repeated except that 3.26 g. of 5-methoxy-2-oxyindole was employed instead of 2.66 g. of 2-oxyindole to give 1.1 g. of the desired product melting at 175°C.

Analysis for $C_{11}H_{11}NO_2S_2$
Calculated: C,52.16%; H,4.38%; N,5.92%
Found: C,52.12%; H,4.42%; N,5.73%

EXAMPLE 11.

Methyl 5-chloro-2-hydroxyindole-3-dithiocarboxylate

The same procedure as in the above Example 3 was repeated except that 2.0 g. of 5-chloro-2-oxyindole, 1.14 g. of sodium hydride (containing 50% mineral oil), 0.91 g. of carbon disulfide and 0.75 g. of dimethyl sulfate were employed to give 0.4 g. of the desired product melting at 167°C (with decomposition).

Analysis for $C_{10}H_8NOS_2Cl$
Calculated: C,46.59%; H,3.13%; N,5.44%
Found: C,46.25%; H,3.06%; N,5.44%

EXAMPLE 12.

Methyl 7-chloro-2-hydroxyindole-3-dithiocarboxylate

In 40 ml. of anhydrous tetrahydrofuran were suspended 1.5 g. of 7-chloro-2-oxyindole and 0.86 g. of sodium hydride (containing 50 percent mineral oil). The resulting suspension was heated to an inner temperature of about 50°C, allowed to cool with stirring for 1 hour and then cooled to a temperature below 5°C. To the cooled suspension was gradually added dropwise an anhydrous tetrahydrofuran solution containing 0.685 g. of carbon disulfide. After completion of the dropwise addition, the resulting mixture was stirred for 1 hour. Then, 0.565 g. of dimethyl sulfate was added dropwise thereto under cooling. After completion of the dropwise addition, the resulting mixture was stirred for additional 1 hour.

Then, the reaction mixture was poured onto a large amount of ice-water, the resulting mixture was made acidic by addition of hydrochloric acid and then the precipitate thus formed was extracted with ether. The ether extract was dried over anhydrous sodium sulfate, the ether was distilled off and the residue was chromatographed through a silica gel column using chloroform as a solvent. The chloroform fractions were collected and the chloroform was distilled off to give 0.5 g. of the desired product melting at 170°C (with decomposition).

Analysis for $C_{10}H_8NOS_2Cl$
Calculated: C,46.59%; H,3.13%; N,5.44%
Found: C,46.84%; H,3.40%; N,5.16%

EXAMPLE 13.

Methyl 5-bromo-2-hydroxyindole-3-dithiocarboxylate

The same procedure as in the above Example 12 was repeated except that 1.5 g. of 5-bromo-2-oxyindole, 0.68 g. of sodium hydride (containing 50 percent mineral oil), 0.54 g. of carbon disulfide and 0.45 g. of dimethyl sulfate were employed to give 0.3 g. of the desired product melting at above 150°C (with gradual decomposition).

Analysis for $C_{10}H_8NOS_2Br$
Calculated: C,39.74%; H,2.65%; N,4.64%
Found: C,39.36%; H,2.61%; N,4.36%

EXAMPLE 14.

Ethyl 5-bromo-2-hydroxyindole-3-dithiocarboxylate

The same procedure as in the above Example 12 was repeated except that 3.0 g. of 5-bromo-2-oxyindole, 1.37 g. of sodium hydride (containing 50 percent mineral oil), 1.09 g. of carbon disulfide and 1.09 g. of diethyl sulfate were employed to give 0.4 g. of the desired product melting at 160° – 170°C. (with decomposition).

Analysis for $C_{11}H_{10}NOS_2Br$
Calculated: C,41.77%; H,3.16%; N,4.43%
Found: C,41.57%; H,3.32%; N,4.39%

EXAMPLE 15.

Methyl 2-hydroxy-5-nitroindole-3-dithiocarboxylate

In 40 ml. of dimethylformamide were suspended 3.56 g. of 5-nitro-2-oxyindole and 1.92 g. of sodium hydride (containing 50 percent mineral oil) to give a brown suspension with evolution of hydrogen. This suspension was cooled to 0°C and a dimethylformamide solution containing 1.52 g. of carbon disulfide was gradually added dropwise thereto with stirring. After completion of the dropwise addition, the resulting mixture was stirred for additional 1 hour and 1.26 g. of dimethyl sulfate was added dropwise thereto under cooling. The resulting mixture was stirred for additional 1 hour.

After completion of the reaction, the reaction mixture was poured onto a large amount of ice-water, the resulting mixture was made acidic by addition of hydrochloric acid and then the crystalline substance thus precipitated was extracted with ethyl acetate. The ethyl acetate extract was washed with water, dried over anhydrous sodium sulfate and then the ethyl acetate was distilled off to give orange crystals, which were recrystallized from chloroform to give 1.0 g. of the desired product melting at 270°C.

Analysis for $C_{10}H_8N_2O_3S_2$
Calculated: C,44.77%; H,3.06%; N,10.44%
Found: C,44.85%; H,3.15%; N,10.54%

EXAMPLE 16.

Methyl 5,7-dimethyl-2-hydroxyindole-3-dithiocarboxylate

The same procedure as in the above Example 3 was repeated except that 2.4 g. of 5,7-dimethyl-2-oxyindole, 1.4 g. of sodium hydride (containing 50 percent mineral oil), 1.1 g. of carbon disulfide and 1.0 g. of dimethyl sulfate were employed to give 0.1 g. of the desired product melting at about 160°C (with decomposition).

Analysis for $C_{12}H_{13}NOS_2$
Calculated: C,57.37%; H,5.22%; N,5.58%
Found: C,56.80%; H,5.28%; N,5.93%

EXAMPLE 17.

Benzyl 2-hydroxyindole-3-dithiocarboxylate

In 35 ml. of anhydrous tetrahydrofuran were suspended 2.0 g. of 2-oxyindole and 1.44 g. of sodium hydride (containing 50 percent mineral oil) to give a brown suspension with evolution of hydrogen. This suspension was cooled to 0°C and an anhydrous tetrahydrofuran solution containing 1.1 g. of carbon disulfide was gradually added dropwise thereto under cooling. After completion of the dropwise addition, the resulting mixture was stirred for additional 1 hour. To the mixture was added dropwise 2.8 g. of benzyl iodide under cooling. After completion of the dropwise addition; the resulting mixture was allowed to stand overnight.

After completion of the reaction, the reaction mixture was treated in the same manner as in the above Example 3 to give 1.0 g. of the desired product melting at 160°C (with decomposition).

Analysis for $C_{16}H_{13}NOS_2$
Calculated: C,64.17%; H,4.34%; N,4.68%; S,21.46%
Found: C,64.66%; H,4.14%; N,4.53%; S,21.53%

Following the same procedure as described above except that 1-methyl-2-oxyindole was employed instead of the 2-oxyindole, there was obtained benzyl 1-methyl-2-hydroxyindole-3-dithiocarboxylate.

What is claimed is:
1. A compound having the formula

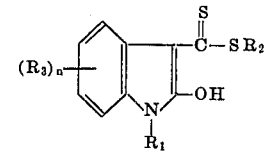

wherein $R_1$ is hydrogen atom, a lower alkyl group, a phenyl or naphthyl group or a benzyl or phenethyl group; $R_2$ is a lower alkyl group or a benzyl or phenethyl group $R_3$ is hydrogen atom, a lower alkyl group, a halogen atom, nitro group or a lower alkoxy group; and $n$ is an integer of 1–4 inclusive provided that where $n$ is 2 or more $R_3$ may be the same or different.

2. The compound according to claim 1 wherein $R_1$ is hydrogen atom, methyl group or phenyl group; $R_2$ is an alkyl group of 1 - 4 carbon atoms or benzyl group; $R_3$ is hydrogen atom, methyl group, methoxy group, chlorine atom or bromine atom; and $n$ is an integer of 1 or 2.

3. Methyl 1-methyl-2-hydroxyindole-3-dithiocarboxylate.

4. Ethyl 1-methyl-2-hydroxyindole-3-dithiocarboxylate.

5. Methyl 2-hydroxyindole-3-dithiocarboxylate.

6. Ethyl 2-hydroxyindole-3-dithiocarboxylate.

7. n-Propyl 2-hydroxyindole-3-dithiocarboxylate.

8. n-Butyl 2-hydroxyindole-3-dithiocarboxylate.

9. Methyl 2-hydroxy-5-methylindole-3-dithiocarboxylate.

10. Methyl 2-hydroxy-7-methylindole-3-dithiocarboxylate.

11. Methyl 2-hydroxy-5-methoxyindole-3-dithiocarboxylate.

12. Methyl 5-chloro-2-hydroxyindole-3-dithiocarboxylate.

13. Methyl 7-chloro-2-hydroxyindole-3-dithiocarboxylate.

14. Methyl 5-bromo-2-hydroxyindole-3-dithiocarboxylate.

15. Ethyl 5-bromo-2-hydroxyindole-3-dithiocarboxylate.

16. Methyl 5,7-dimethyl-2-hydroxyindole-3-dithiocarboxylate.

17. Benzyl 2-hydroxyindole-3-dithiocarboxylate.

18. A compound of claim 1 comprising methyl 1-phenyl-2-hydroxyindole-3-dithiocarboxylate.

* * * * *